(12) United States Patent
Knox

(10) Patent No.: US 9,566,895 B2
(45) Date of Patent: Feb. 14, 2017

(54) SYSTEM FOR MOVABLY SUPPORTING A SEPARATION MEMBER

(71) Applicant: Ancra International LLC, Azusa, CA (US)

(72) Inventor: Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 14/744,281

(22) Filed: Jun. 19, 2015

(65) Prior Publication Data

US 2015/0377268 A1    Dec. 31, 2015

Related U.S. Application Data

(60) Provisional application No. 62/018,219, filed on Jun. 27, 2014.

(51) Int. Cl.
| | |
|---|---|
| *B60P 7/00* | (2006.01) |
| *B60P 7/15* | (2006.01) |
| *F16B 9/02* | (2006.01) |
| *F16M 13/02* | (2006.01) |
| *B65D 25/06* | (2006.01) |
| *B60P 7/08* | (2006.01) |
| *B60P 7/14* | (2006.01) |
| *F16B 2/18* | (2006.01) |

(52) U.S. Cl.
CPC .. *B60P 7/15* (2013.01); *B60P 7/00* (2013.01); *B60P 7/0876* (2013.01); *B60P 7/14* (2013.01); *B65D 25/06* (2013.01); *F16B 9/023* (2013.01); *F16M 13/022* (2013.01); *F16B 2/185* (2013.01)

(58) Field of Classification Search
CPC ............. F16B 9/023; F16B 2/185; B60P 7/00; B60P 7/0876; B60P 7/14; B60P 7/15; B65D 25/06; F16M 13/022
USPC . 248/200.1; 224/42.4; 296/100.12; 410/100, 89, 118, 104, 148, 143
See application file for complete search history.

(56) References Cited

U.S. PATENT DOCUMENTS

| | | |
|---|---|---|
| 3,995,565 A | 12/1976 | Kersey |
| 4,136,422 A | 1/1979 | Ivanov et al. |
| 4,781,498 A | 11/1988 | Cox |
| 4,867,623 A | 9/1989 | Loyd |

(Continued)

OTHER PUBLICATIONS http://www.pickupspecialities.com/Cargo_catch/cargo_catch.htm, Pickup Specialties.com, Cargo Catch Truck Bed Organizer, 3 pp., Jun. 15, 2014.

(Continued)

*Primary Examiner* — Anita M King
(74) *Attorney, Agent, or Firm* — Brinks Gilson & Lione

(57) ABSTRACT

A system for movably supporting a separation member is provided. The system includes a keeper comprising a body and at least one leg that extends from the body and is configured to be slidably mounted within a track, the keeper is configured to receive and movably support an end of an elongate member configured to support a portion of a separation member, the keeper further comprises a finger that may be selectively disposed in an engagement position such that the finger extends below a lower surface of the body and a sliding position. An operator is operatively connected with the finger, and is manipulable to urge the finger to transition between the engagement and sliding positions.

44 Claims, 11 Drawing Sheets

(56) References Cited

U.S. PATENT DOCUMENTS

| | | | |
|---|---|---|---|
| 5,924,611 A | 7/1999 | Mizuno | |
| 6,062,780 A * | 5/2000 | Petelka | B60P 7/15 410/143 |
| 6,074,143 A * | 6/2000 | Langston | B60P 7/15 410/143 |
| 6,183,177 B1 | 2/2001 | Dahlgren | |
| 6,644,901 B2 | 11/2003 | Breckel | |
| 6,739,811 B1 * | 5/2004 | Petelka | B60P 1/00 410/143 |
| 6,749,241 B1 | 6/2004 | Erlandsson et al. | |
| 6,846,140 B2 | 1/2005 | Anderson et al. | |
| 7,080,677 B2 | 7/2006 | Nölle | |
| 7,241,093 B2 | 7/2007 | Zuniga | |
| 7,481,478 B2 | 1/2009 | Cho et al. | |
| 7,517,181 B2 | 4/2009 | Dunaway et al. | |
| 7,950,884 B2 | 5/2011 | Thompson | |
| 7,980,798 B1 | 7/2011 | Kuehn et al. | |
| 8,172,494 B1 * | 5/2012 | Knox | B60P 1/00 410/143 |
| 8,568,071 B2 | 10/2013 | Dier et al. | |
| 8,757,944 B2 * | 6/2014 | Calico | B60P 1/00 410/143 |
| 8,757,946 B1 * | 6/2014 | Chou | B60P 7/0815 410/104 |
| 9,090,191 B2 * | 7/2015 | Squyres | B60P 7/15 |
| 2005/0180835 A1 | 8/2005 | Schneider | |
| 2015/0110568 A1 | 4/2015 | Squyres | |
| 2015/0110569 A1 | 4/2015 | Squyres | |
| 2015/0110570 A1 | 4/2015 | Squyres | |
| 2015/0110571 A1 | 4/2015 | Squyres | |
| 2015/0110572 A1 | 4/2015 | Squyres | |

OTHER PUBLICATIONS http://www.homedepot.com/p/Keeper-Ratcheting-Cargo-Bar-with-Storage-net-05060/203 . . . , 1 p., Jun. 15, 2015.

* cited by examiner

SYSTEM FOR MOVABLY SUPPORTING A SEPARATION MEMBER

CROSS-REFERENCE TO RELATED APPLICATIONS

This application claims priority from U.S. Provisional Application No. 62/018,219, filed on Jun. 27, 2014, the entirety of which is hereby fully incorporated by reference herein.

TECHNICAL FIELD

This disclosure relates to structures to retain a net, or similar structure within a selected position within a cargo compartment.

BRIEF SUMMARY

A representative embodiment of the disclosure is provided. The embodiment includes a system for movably supporting a separation member for a cargo container. The system includes a keeper comprising a body and at least one leg that extends from the body and is configured to be slidably mounted within a track, the keeper is configured to receive and movably support an end of an elongate member configured to support a portion of a separation member, the keeper further comprises a finger that may be selectively disposed in an engagement position such that a cantilevered portion of the finger that extends below a lower surface of the body, and a sliding position where the cantilevered portion is disposed above the lower surface of the body, and wherein when the finger transitions between the engagement position and the sliding position the finger transitions through a neutral position, and wherein the finger is biased to the engagement position when on a first side of the neutral position and to be biased to the sliding position when on a second side of the neutral position opposite from the first side. An operator is operatively connected with the finger, the operator is manipulable to urge the finger to transition between the engagement and sliding positions.

A second representative embodiment of the disclosure is provided. The embodiment includes a system for movably supporting a separation member for disposal within a cargo compartment. The system includes first and second elongate tracks configured for being rigidly mounted upon opposite walls of a cargo compartment and an elongate member that hangably supports a movable separation member. A first keeper supports a first end of the elongate member and a second keeper that supports a respective second end of the elongate member. Each of the first and second keepers comprise a body and first and second legs that extend from the body and are configured to be slidably mounted within the respective first or second track when mounted to a wall of a cargo container, the keeper further comprises a finger that may be selectively disposed in an engagement position with a cantilevered portion that extends below a lower surface of the body, and a sliding position where the cantilevered portion is disposed above the lower surface of the body, and wherein when the finger transitions between the engagement position and the sliding position the finger transitions through a neutral position, and wherein the finger is biased to the engagement position when on a first side of the neutral position and to be biased to the sliding position when on a second side of the neutral position opposite from the first side. An operator that is operatively connected with the finger, the operator is manipulable to urge the finger to transition between the engagement and sliding positions.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
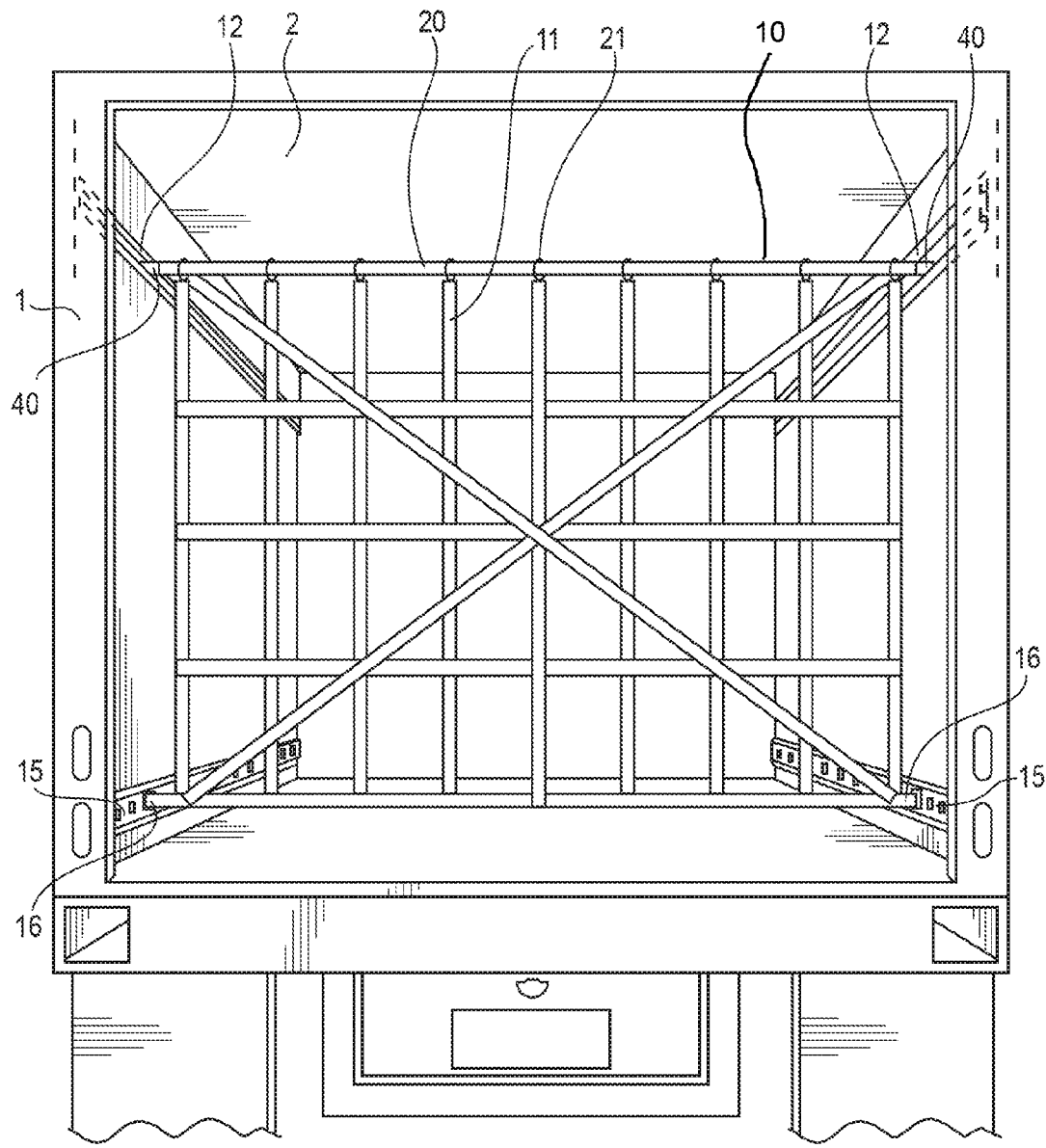
FIG. 1 is a rear view of a cargo compartment of a truck, with a net disposed therein on opposite upper tracks with respective keepers and an upper elongate member.

Turning now to FIGS. 1-15, a system 10 to movably support a retaining member 11, such as a flexible cargo net, a hanging bulkhead, a hanging flexible member such as a reinforced sheet, within a cargo compartment 2 is provided. The system 10 is provided to allow for the retaining member 11 to be mounted and retained in a selected position across the width of the cargo compartment 1 to divide the cargo compartment 2 into two segregated compartments. The system 10 is configured to allow the user to translate the retaining member through the length of the cargo compartment 2, such that the user can adjust the relative size of each of the two segregated compartments in a relatively quick manner. The system 10 is configured to allow a single person to quickly and easily translate the retaining member 11 within the cargo compartment without the need for a ladder (to reach the upper portion of the retaining member 11), which may be disposed proximate to the ceiling of the cargo compartment 2. The system is also configured to rigidly retain the retaining member in the desired position, and then to allow for the net to be slid within the cargo compartment 2 with a minimum of time and steps.

The system 10 may include one or more of the components recited herein. One of ordinary skill in the art will understand that the components recited herein are operable with each other, and that modifications to these components are contemplated, as will be appreciated by one of ordinary skill after a thorough review and consideration of this specifications.

The system 10 may include at least two tracks 12 that are fixedly mounted upon the walls of the cargo compartment 10, and may be positioned horizontally upon the side walls and disposed proximate to the ceiling of the cargo compartment 2. In some embodiments, the two tracks 12 may be positioned at the same height within the cargo compartment 2, such that an elongate member 20, which is slidably mounted thereon (by way of a keeper 40, discussed below) is disposed at a horizontal orientation (i.e. substantially parallel to the ceiling of the cargo compartment 2, such as within one or two degrees of being parallel to the ceiling). Each of the opposite first and second ends 20a, 20b of the elongate member may be pivotably mounted to a keeper 40, which, in turn, is mounted within the track 12. The keeper 40 may be slidably mounted within the track 12 such that the keeper 40 is free to slide in a first direction (X, FIGS. 7-11) if urged in that direction, but is generally prevented from sliding in the second direction (Y, FIGS. 7-11) opposite from the first direction X. In some embodiments, the keeper 40 may be disposed upon the track such that the first (slidable) direction is toward an enclosed end of the cargo compartment 2 (such as proximate to the cab of the truck that pulls the cargo compartment 2).

The elongate member 20 is configured to hangingly support the separation member thereon, such as with a plurality of rings 21, hooks, or other attachment structure. In embodiments where the elongate member 20 can increase or decrease in length as necessary, the rings 21 may slide along the elongate member 20 such that the separation member 11, and in some embodiments portions of the separation member 11, can move along the length of the elongate member, and local portions of the separation member 11 can locally bunch up, or be stretched (in embodiments where the separation member 11 is flexible) upon the elongate member 20.

Figure 2:
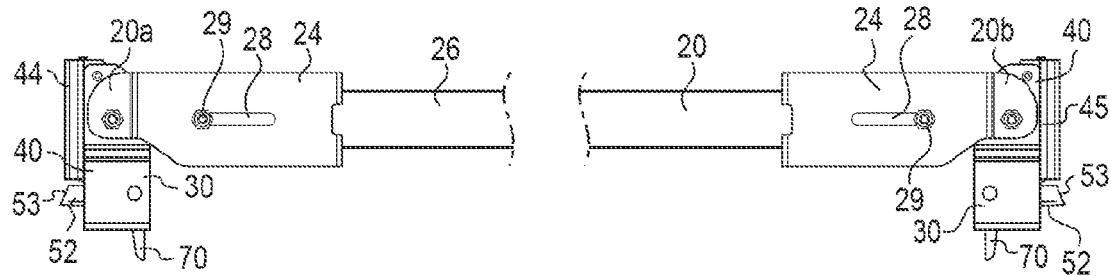
FIG. 2 is a top view of the elongate member and keepers on both ends thereof with the fingers in each keeper in an engagement position.
Figure 3:
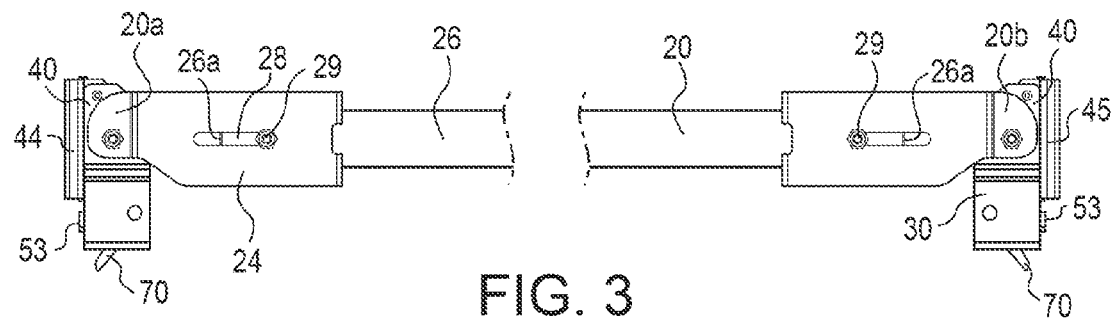
FIG. 3 is the view of FIG. 2 with the fingers in each keeper in a sliding position.
Figure 3A:
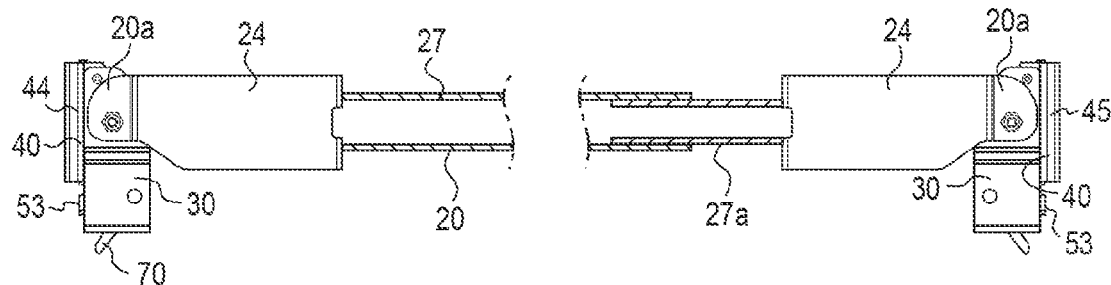
FIG. 3a is the view of FIG. 3 showing a telescoping elongate member.
Figure 4:
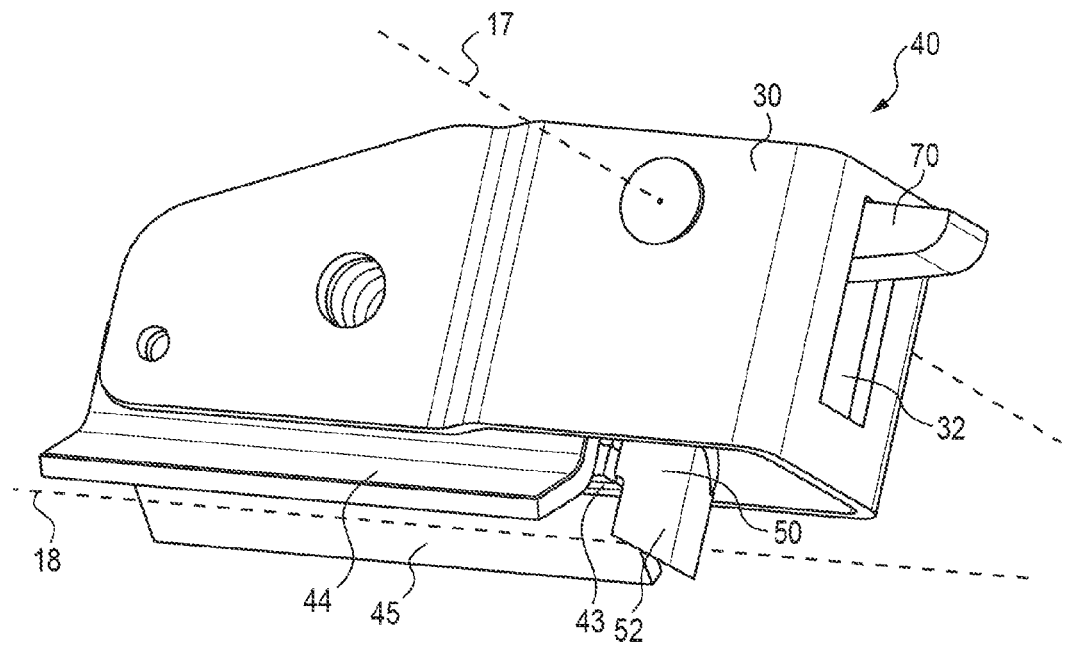
FIG. 4 is a perspective view of the keeper of FIG. 2 with the finger in an engagement position.

As best shown in FIGS. 2-3a, the elongate member 20 may be formed from a center beam 26 (which may be an elongate cylindrical rod, a rectangular beam, or another geometric structure) that is slidably connected on its opposite ends to respective fixtures 24, which are each pivotably connected (such as with a pinned connection) to the body 42 of a keeper 40. The elongate member 20 is configured to be somewhat extendable or retractable in length, such as from a nominal length (L1, FIG. 15) that is long enough to horizontally span the width of the cargo compartment 2 between the opposed tracks 12, not including the width covered by the keepers 40 that are mounted on one or both ends 20a, 20b of the elongate member, to an extended length (L2, FIG. 15) necessary to allow the keepers 40 to be disposed at different relative positions along the opposite tracks as shown schematically in FIG. 15 (as is necessary if a single person is moving the opposite keepers to translate the separation member 11 into a different position within the cargo compartment 2)

Figure 12:
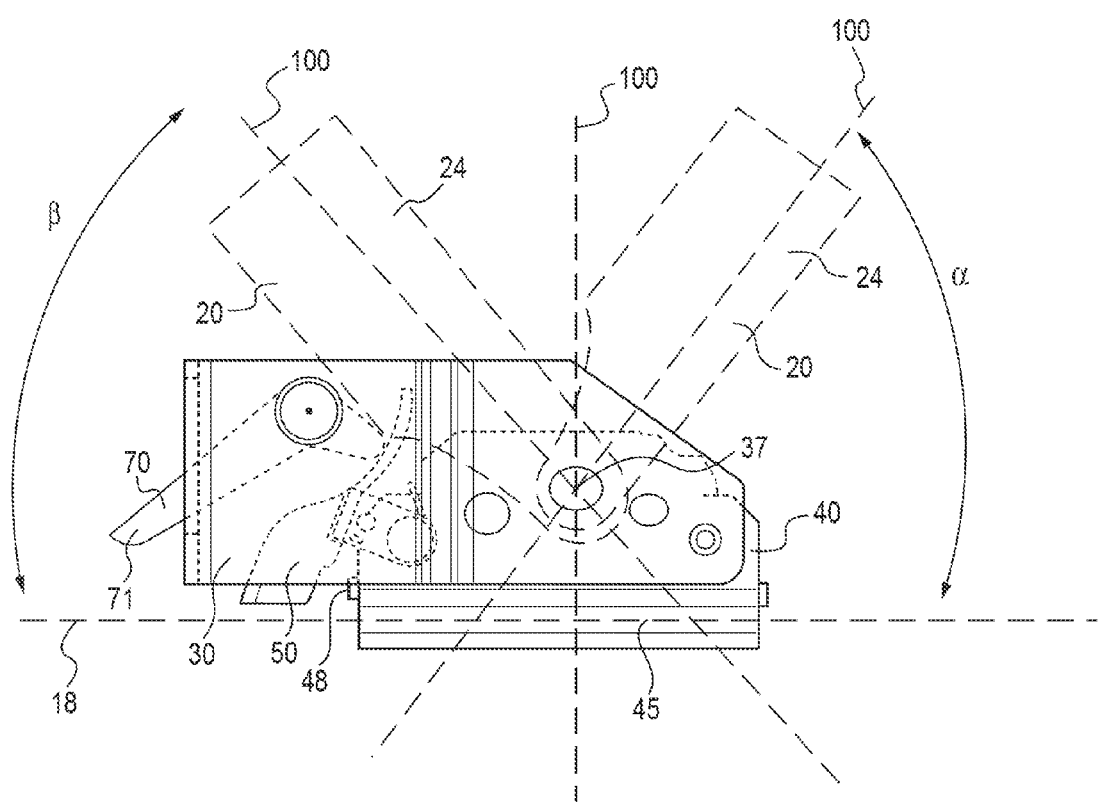
FIG. 12 is a top view of the keeper and a fixture of the elongate member pivoted with respect to the keeper in two opposite directions.

As schematically depicted in FIG. 12, the fixture 24 of the elongate member 20 is pivotable about the keeper 40 (and housing 30, discussed below), such as with a pivot connection 37) to allow the fixture 24 to be aligned perpendicular to the keeper 40 as well as within a range of acute angles with respect to the keeper 40. In other words, the fixture 24 is rotatable about the keeper 40 such that a longitudinal axis 100 through the fixture 24 may take a range of angles with respect to a line parallel to the one or more legs 44, 45 of the keeper 40 (and also parallel to the length (longitudinal axis) of the track 12). For example, the fixture 24 may be positionable in an orientation where the fixture is perpendicular to the track (and legs 44, 45 of the keeper 40) as well as at an acute angle ($\alpha$, $\beta$) with respect to the longitudinal axis of the track 12 on either side of the perpendicular. In some embodiments, the range of acute angles may be from just below 90 degrees to about 45 degrees, or smaller ranges such as just below 90 degrees to about 80 or 70 degrees (inclusive of all angles therein). One of ordinary skill in the art will appreciate that the range of angles that the elongate member 20 could make with respect to the keeper 40 is a function of the extendable length of the elongate member 20, as discussed above. The elongate member 20 is pivotably supported upon the body of the keeper 40 such that the elongate member 20 can extend from the body of the keeper such that the longitudinal axis 100 through the elongate member 20 can make the acute angle with respect to the longitudinal axis of the track whether a horizontal vector component (R or R') of the elongate member extends toward a first end of the track or whether the horizontal vector component of the track extends toward an opposite second end of the track.

As shown in FIGS. 2 and 3, the center beam 26 may be slidably mounted within fixtures 24 disposed upon each opposite end of the center beam 26, with the center beam 26 including a pin 29 (or a rod, or fastener, or the like) that extends through a slot 28 in the fixture 24, which allows for longitudinal sliding motion between the center beam 26 and each fixture 24. As depicted in FIG. 3, the ends 26a of the center beam may be aligned within the fixtures 24. As will be appreciated, this sliding motion causes the over length of the elongate member 20 to vary, as indexed by the overall length of the slot 28 in each of the fixtures 24.

In other embodiments shown in FIG. 3a, the center beam 26 may be formed from first and second members 27, 27a (or in some embodiments three or more members) that are telescopingly mounted together, such that the overall length of the center beam 26 may vary as the two keepers 40 are slid to different positions along the tracks 12. In some embodiments a center beam 26 with two or more telescoping members 27, 27a may also be slidably mounted to opposite fixtures 24 with the pins 29 and slots 28 as discussed above for added variability to the overall length of the elongate member 20.

Figure 13:
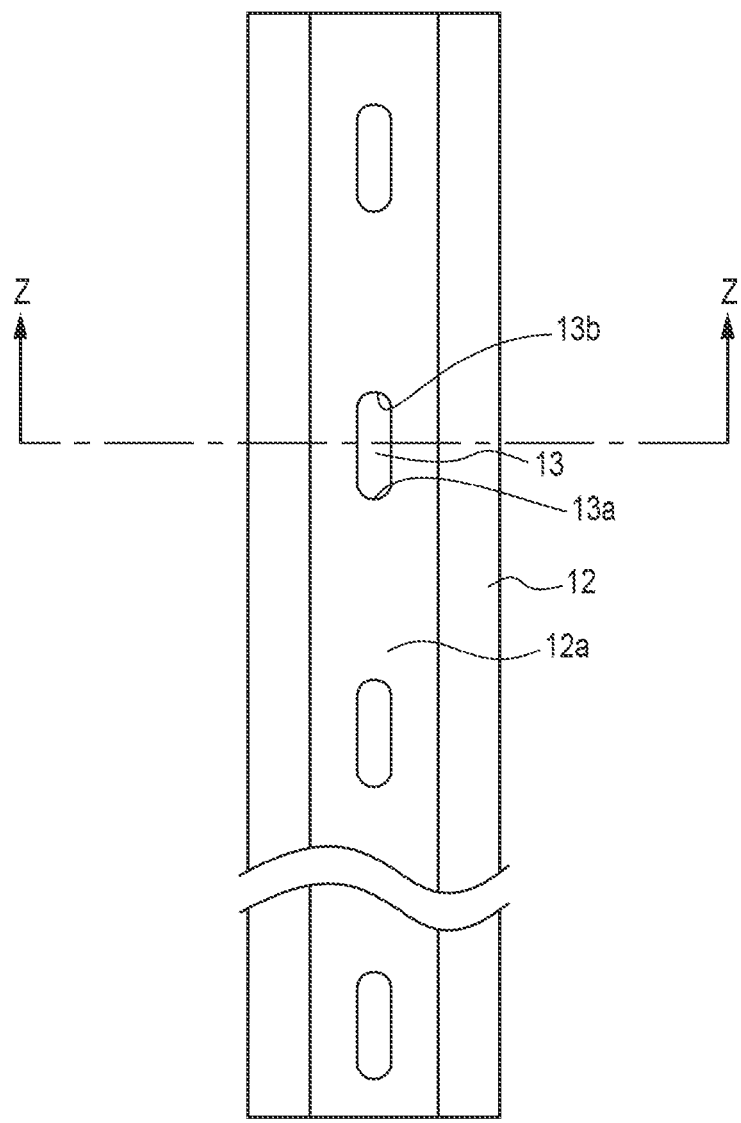
FIG. 13 is a top view of the track that is configured to slidably receive the keeper therein.
Figure 14:
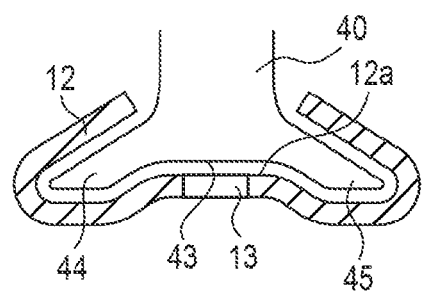
FIG. 14 is a sectional view of the track of FIG. 13 about the section z-z.

The keeper 40 is best shown in FIGS. 4-11. The keeper 40 includes a body 42 that rigidly supports one or two legs 44, 45 that extend therefrom. One of skill in the art will appreciate that the number, size, and geometry of the one or two (or more) legs 44, 45 is a function of the size and geometry of the track 12 through which the keeper 40 is slidingly mounted. A representative example of a track is depicted in FIGS. 13 and 14, and one of ordinary skill will appreciate with a review of FIG. 14 that the legs 44, 45 of the keeper 40 (FIGS. 4-5) are configured to allow the keeper 40 to slide within the track 12. The body 42 may include a bottom surface 43 that is disposed proximate to the bottom surface 12a of the track 12 when the keeper 40 is mounted therein.

Figure 6:
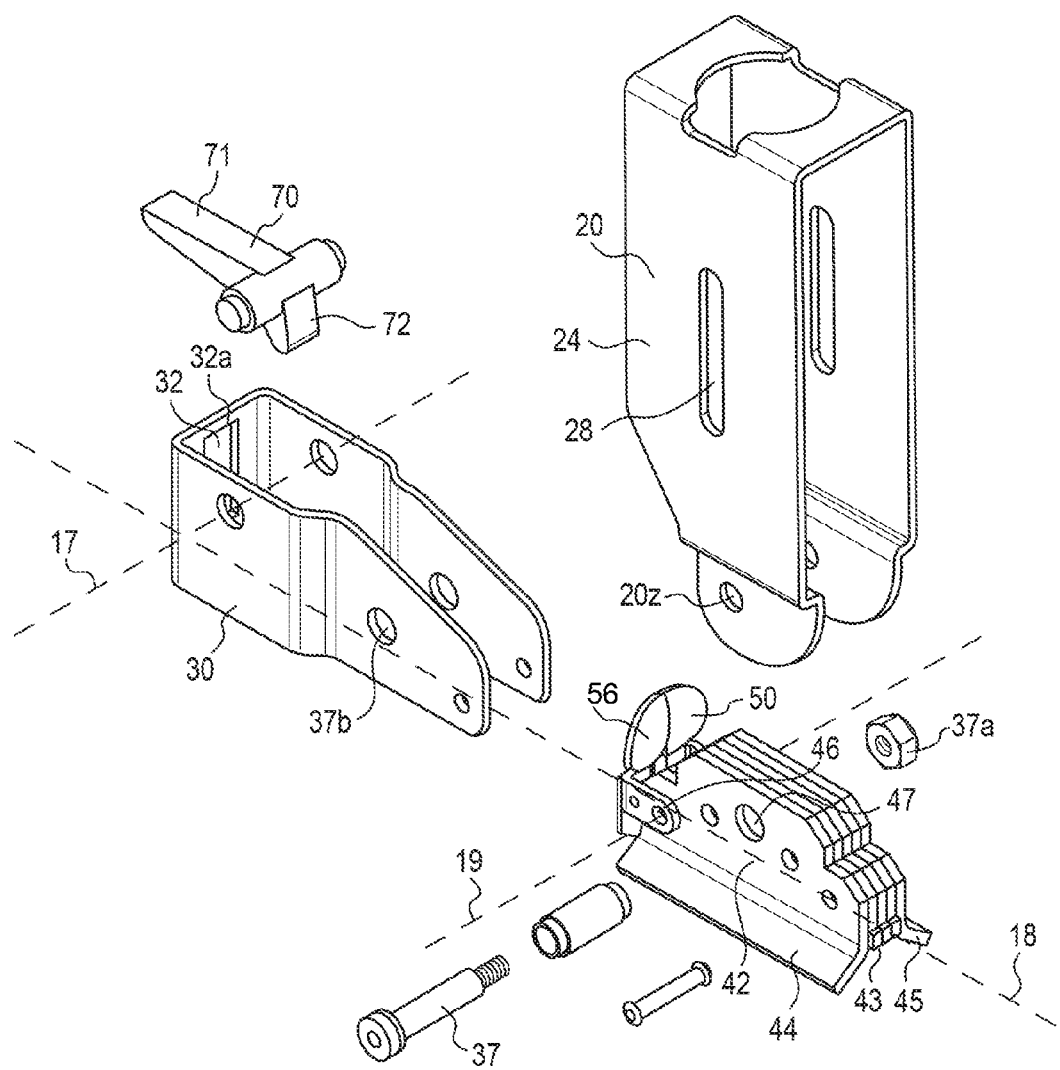
FIG. 6 is an exploded view of the keeper of FIG. 2.
Figure 15:
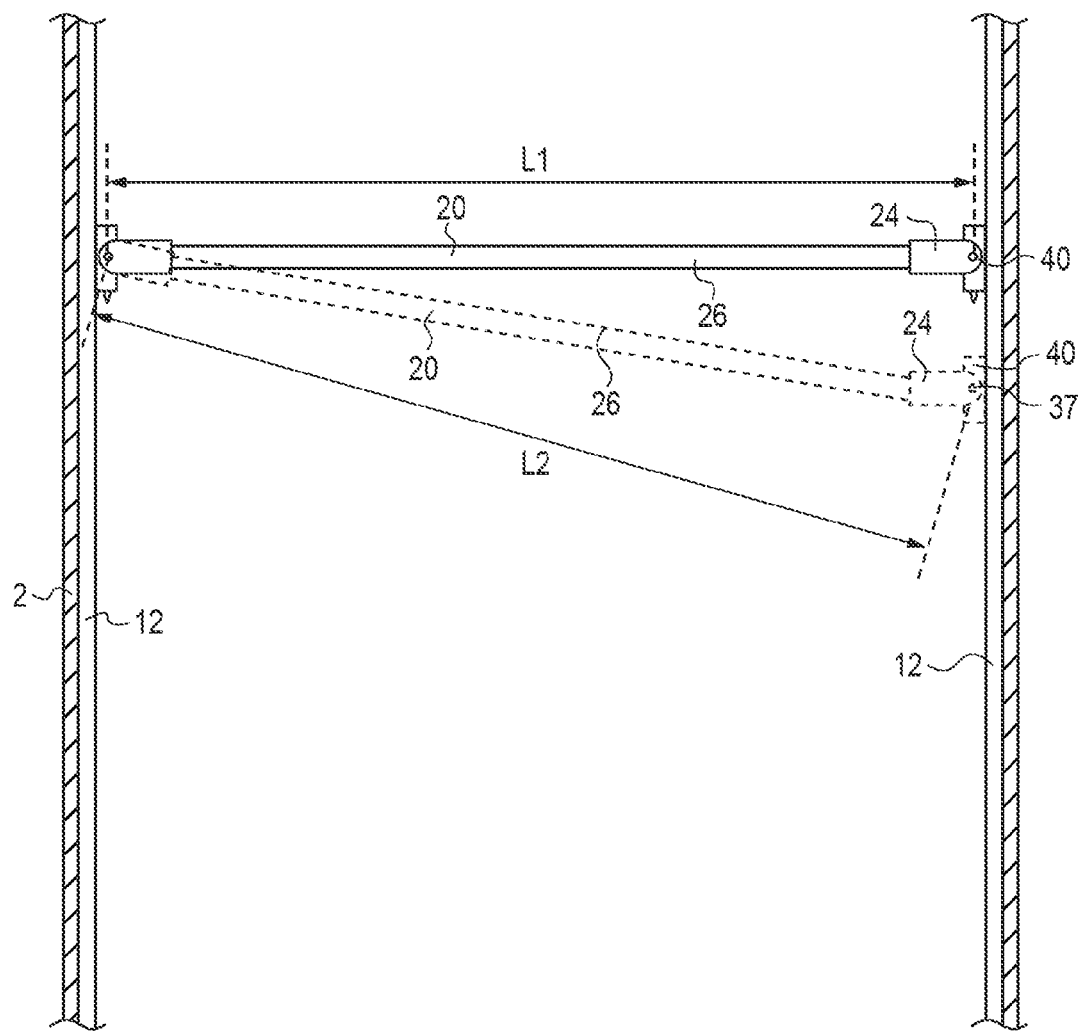
FIG. 15 is a schematic overhead view of the elongate member in two different positions upon opposed tracks within the cargo compartment.

The body 42 of the keeper 40 is surrounded by a housing 30, that provides mechanical protection for the body 42 and pivotably supports an operator 70 (each through separate pinned connections) to allow operator 70 to pivot with respect to the body 42. In some embodiments, the finger 50 may be independently pivotably connected to the housing 30, or the finger 50 may be pivotably connected to the body 42 with a bracket 46 (FIG. 6). The body 42 (and the housing 30) support a connection (such as a pin 37 through respective apertures 47, 37b in the body 42 and the housing 30 and an aperture 20z in the fixture 24, which may be retained by a nut 37a) to pivotably support the fixture 24 with respect to the body 42 for free relative pivoting motion between the body 42 (and ultimately the housing 30 and keeper 40) and the elongate member 20, as schematically shown in FIGS. 12 and 15.

In some embodiments, the body 42 may be a plurality of metal sheets (stamped or machined) that are fixed together to make a sufficient width, or the body 42 could be a machined or cast piece. The first and/or second (or more) legs 44, 45 may be bent into shape or may be formed by other methods. The housing 30 may be a flat metal piece that is bent into shape to allow the housing 30 to surround the majority of the body 42, and to support and surround most of the finger 50, the operator 70 and the engagement therebetween.

As mentioned above, the housing 30 may surround the body and may pivotably support (independently) each of the finger 50 and the operator 70, and the housing 30 may surround (at least in the opposite top and bottom directions, as the keeper 40 is disposed upon the track 12, and in some embodiments, the inboard direction into the cargo compartment, and in some embodiments a portion of the outboard direction) the engagement between the operator 70 and the finger 50.

The finger 50 may be pivotably connected to the body 42, either with a pinned connection, or as shown in FIGS. 6, 7, and 9-11 with a bracket that is pivotably connected to the body 42. The finger 50 may include a cantilevered portion 52 that extends from a first side of the pivotal connection (ultimately with the body 42, or in other embodiments with the housing 30) and a second portion 56 that is on an opposite side of the pivotable connection. In other embodiments, the relative location of the pivot connection and the second portion (which engages the operator 70, discussed below), may be reversed.

The finger 50 is rotatable between an engagement position (FIGS. 4 and 7) where the cantilevered portion 52 extends below the housing 30 and in some embodiments below the bottom surface 43 of the body 42 and a sliding position (FIGS. 5 and 11) where the cantilevered portion 52 is withdrawn above the bottom surface 43 of the body 42. In some embodiments, a spring 39 is disposed in conjunction with the body 42 and the finger 50, which urges the finger into the engagement position, when the finger 50 is in a range of orientations between the engagement position and a neutral position (FIG. 10) that is between the engagement position and the sliding position. The neutral position is discussed in greater detail below. When the finger 50 is between the neutral position and the sliding position, the spring 39 does not bias the finger 50 toward the engagement position.

In some embodiments, the cantilevered portion 52 of the finger 50 engages the body 42, and in some embodiments, a raised portion 48 of the body 42 when the cantilevered portion 52 is in the engagement position. The engagement between the cantilevered portion 52 and the body 42 limits the travel of the finger 50 as biased by the spring 39. In some embodiments, the cantilevered portion 52 includes a leading surface 53 that contacts the leading edge 13a of a slotted opening 13 of the track 12 (discussed below). The leading surface 53 may be aligned to be perpendicular to the longitudinal axis through the track 12 (or an axis parallel to the one or more legs 44, 45 of the keeper) when the finger is in the engagement position. In some embodiments, as best shown in FIG. 8a, the leading surface 53 may extend at an acute angle γ to the longitudinal axis through the track 18, such that the leading surface 53 is urged to easily slide over the bottom surface 12a of the track 12 when the leading surface 53 encounters a trailing edge 13b of the slotted opening 13 of the track 12 (when the keeper 40 is urged in the direction X along the track 12 (as discussed below)). The cantilevered portion 52 may further include an opposite trailing surface 54, which may be aligned perpendicular to the longitudinal axis 18 of the track 12 when the finger 50 is in the engagement position.

The housing 30 pivotably supports an operator 70. The operator 70 includes an input leg 71 that is positioned to be manipulable by the user, and a second working leg 72 that engages the second portion 56 of the finger 50. The second portion 56 may include one or more cam surfaces 56a that slidably receive an end of the working leg 72 of the operator 70 as the operator 70 is pivoted, to allow for desired motion of the cantilevered portion 52 of the finger 50 based upon pivoting motion of the input leg 71 of by the user.

In some embodiments, the housing 30 may include a slot 32 through which a portion of the input leg 71 of the operator 70 extends. The slot 32 and the input leg 71 are defined such the input leg 71 contacts, or is proximate to, a first edge 32a of the slot 32 when the finger is in the engagement position and the input leg 71 contacts, or is proximate to, the opposite second edge 32b of the slot 32 when the operator 70 urges the finger into the sliding position. In some embodiments, the input leg 71 is only proximate to (but does not contact) the first edge 32a of the slot 32 when the cantilevered portion 52 of the finger 50 reaches the engagement position due to contact with the body 42. Accordingly, the length of the slot 32 does not limit the travel of the finger in the direction toward the engagement position. In some embodiments, the housing 30 and operator 70 are constructed such that the input leg 71 contacts the first edge 32a of the slot 32 when the finger reaches the engagement position, while in other embodiments; the input leg 71 is a small distance from the first edge 32a to allow for some "play" therebetween.

In some embodiments, such as the embodiments shown in FIGS. 4-11, the rotational axis 19 of the finger 50 is parallel to the rotational axis 17 of the operator 70, which causes the input leg 71 to be movable horizontally within the cargo compartment 2 when the keeper 40 is disposed upon the track 12 (as shown in FIGS. 2-3a). In other embodiments, the rotational axes of the finger and the operator may be perpendicular to each other (with the rotational axis 17 of the operator 70 being vertical), which would result in an input leg 71 that moves vertically when the keeper 40 is installed upon the track 12. For example, one or both of the finger 50 and the operator 70 may be curved or twisted (90 degrees from their present geometry) to allow for similar operation with perpendicular axes of rotation.

Figure 5:
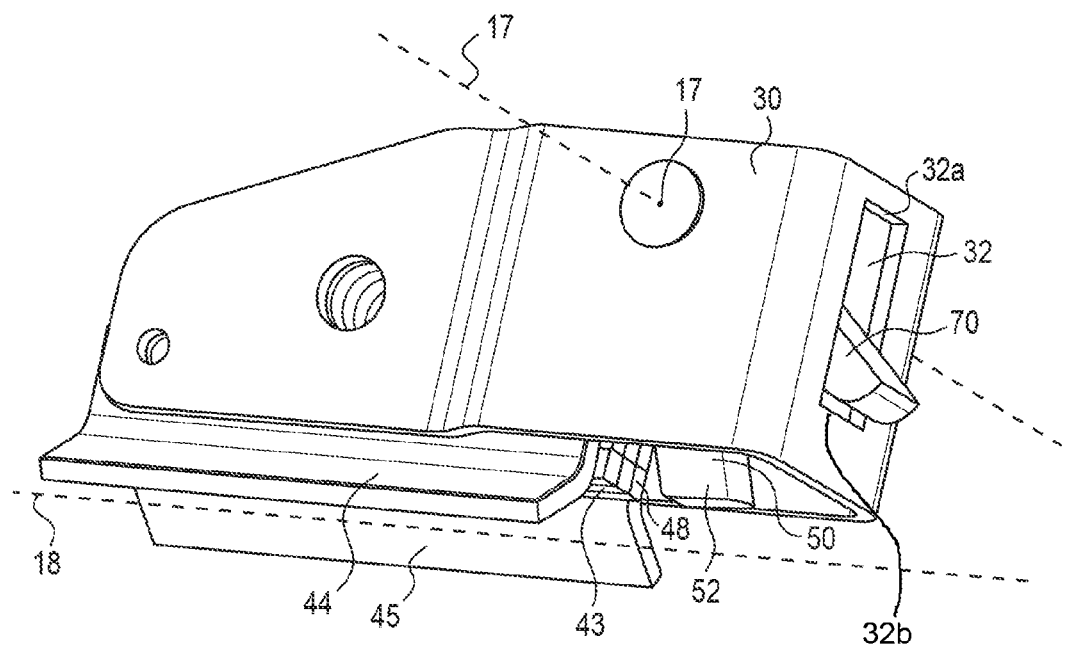
FIG. 5 is the view of FIG. 4 with the finger in a sliding position.

In some embodiments, the sliding position of the finger 50 is reached when the input leg 71 of the operator 70 reaches the opposite second edge 32*b* of the slot 32, which binds the operator 70 to prevent urging the finger 50 further in the direction from the neutral position toward the sliding position. In other embodiments, as shown in FIG. 5, the finger 50 reaches the sliding position before the input leg 71 contacts the second edge 32*b* of the slot 32. In some embodiments, the finger 50 may engage the body 42 with a mechanical stop (or other structure) when the finger has reached the sliding position before the input leg 71 reaches the second edge 32*b*, which allows for some "play" therebetween.

Turning now to FIGS. 7-11 and with reference to FIG. 13, the keeper 40 is depicted slidably disposed within the track 12. The track 12 includes a plurality of spaced slotted openings 13 that extend through the bottom surface 12*a* of the track 12 and disposed to receive a portion of the cantilevered portion 52 of the finger 50 therethrough. The slotted openings 13 may be aligned with consistent or inconsistent spacing along the length of the track 12. The slotted openings 13 each extend between leading and trailing edges 13*a*, 13*b*.

Figure 7:
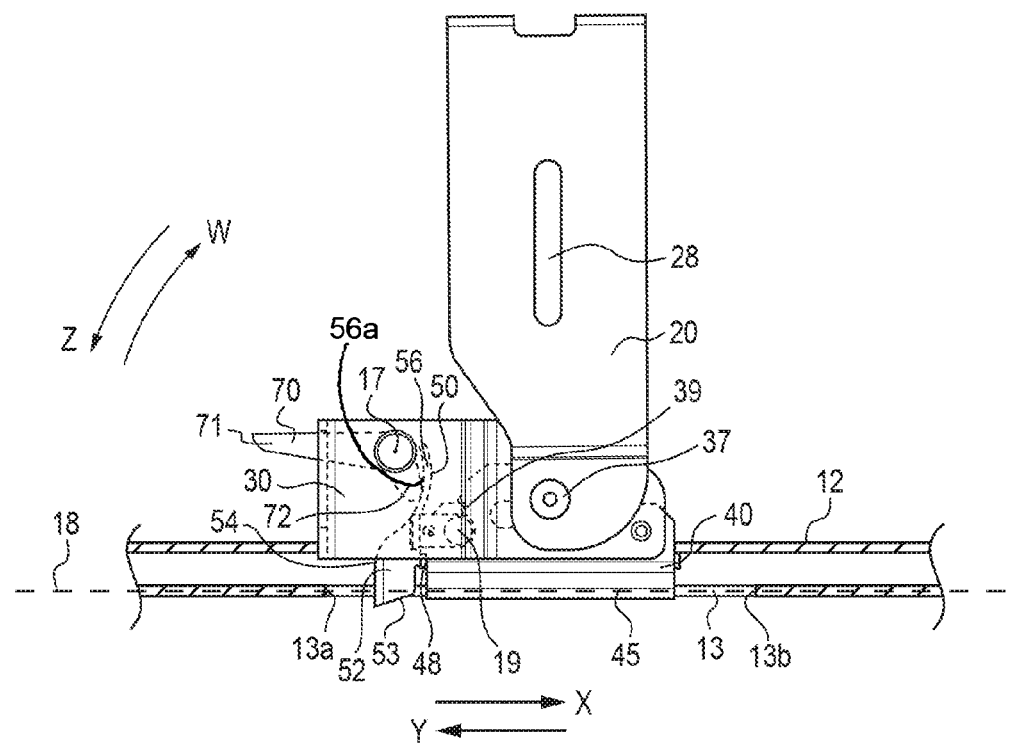
FIG. 7 is a partial cross-sectional view of the keeper mounted upon a track, showing the finger in an engagement position and extending through a slot in the track.

FIG. 7 depicts the finger 50 in the engagement position with the cantilevered portion 52 of the finger extending through a slotted opening 13. The keeper 40 is free to slide in either direction X or Y along the track 12 until the cantilevered portion 52 engages the respective leading edge 13*a* (when urged in the direction Y) or trailing edge 13*b* (when urged in the direction X).

Figure 8:
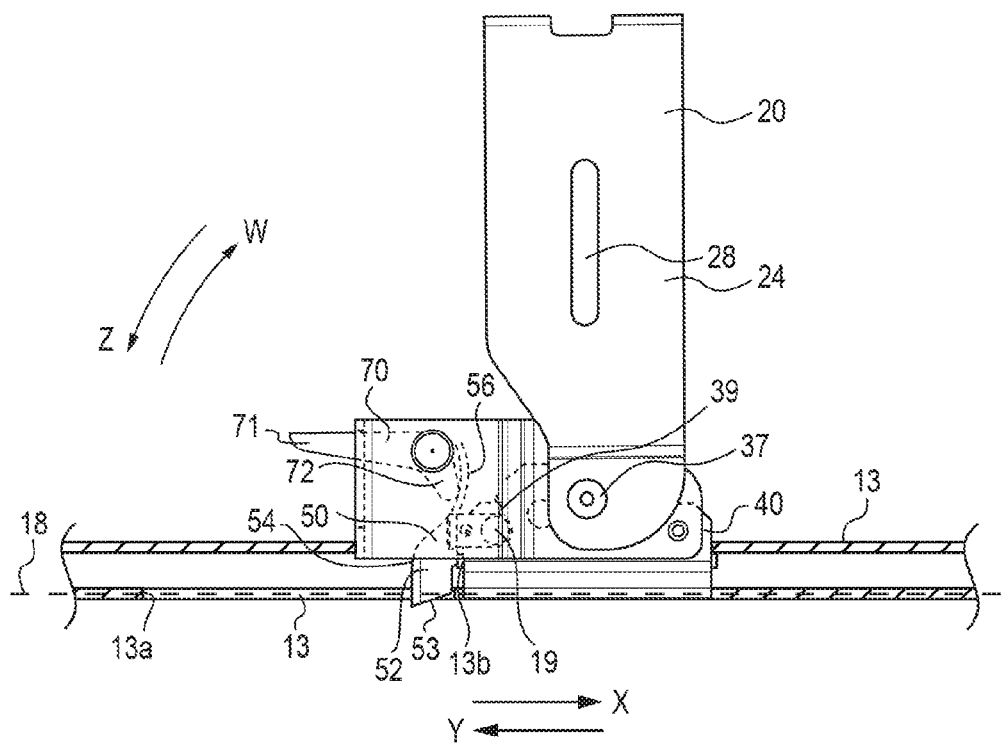
FIG. 8 is the view of FIG. 7 showing the finger extending through a slot in the track and proximate to a trailing edge of the slot.
Figure 8A:
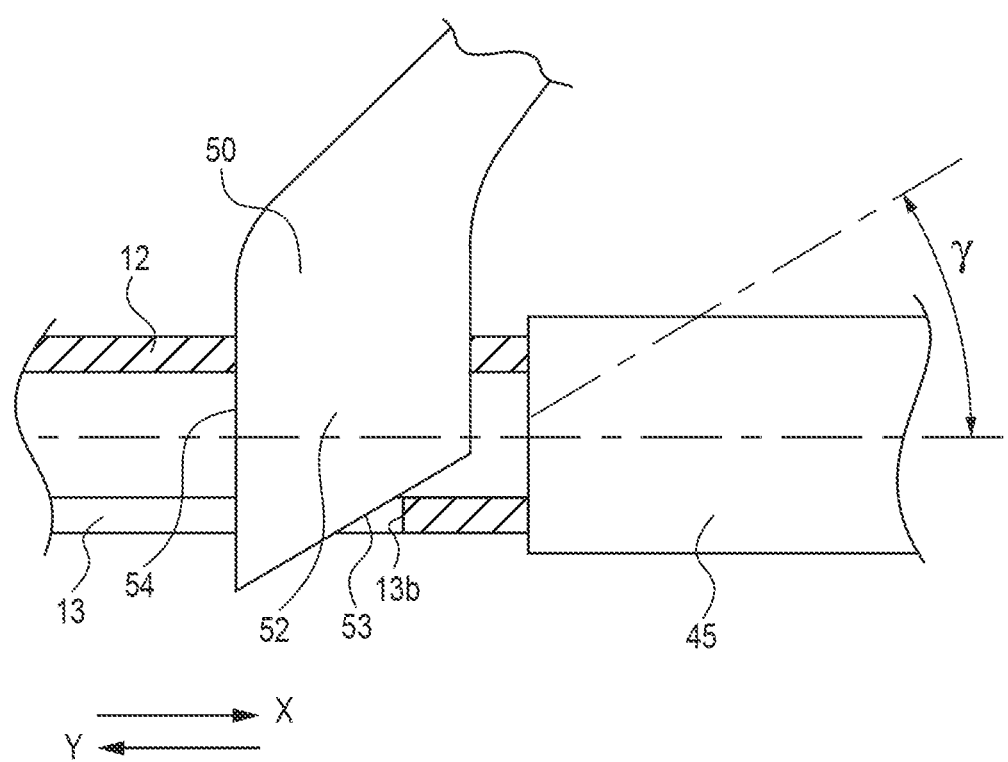
FIG. 8a is a detail view of detail A of FIG. 8.
Figure 9:
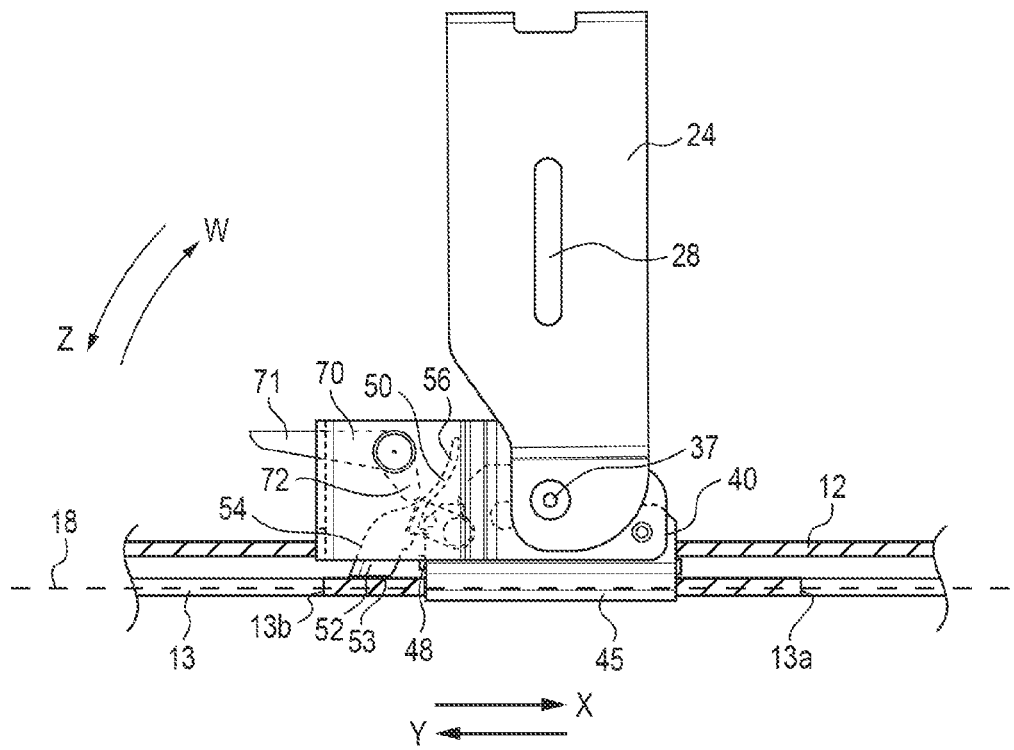
FIG. 9 is the view of FIG. 7 showing the finger urged slightly toward the neutral position by the track.

FIG. 8 depicts the keeper urged from the position of FIG. 7 until the leading surface 53 engages the trailing edge 13*b* of the slotted opening 13. If the keeper 40 continues to be urged in the direction X, the trailing edge 13*b* will impart a force (in the horizontal direction (i.e. in the direction Y)). This force will urge the finger 50 to rotate in the direction W (FIG. 8) against the biasing force of the spring 39. With sufficient rotation, the leading surface 53 clears the bottom surface 12*a* of the track and no further force is imparted upon the finger 50, and the keeper 40 may be slid further along the track in the direction X, as shown in FIG. 9. With sufficient sliding in the direction X, the leading surface 53 encounters the leading edge 13*a* of the adjacent slotted opening 13 and the spring 39 biased the cantilevered portion 52 to extend into that slotted opening 13. As shown in FIG. 9, when the finger 50 is rotated in the direction W by the trailing edge 13*b*, the operator 70 may lose contact with the second portion 56 of the finger 50.

As can be understood with reference to FIGS. 7-9, when the cantilevered portion 52 extends into the slotted opening 13, the keeper 40 can be slid in the direction Y until the trailing surface 54 contacts the leading edge 13*a* of the slotted opening. Because the finger 50 (in the engagement position shown in FIG. 7) contacts the body 42, in some embodiments at a raised portion 48 or other surface, the finger is prevented from rotating in the direction Z (as urged by the force from the leading surface 13*a* upon the finger 50), and therefore the contact between the leading edge 13*a* and the finger 50 prevents further movement of the keeper 40 in the direction Y. In some embodiments, the system 10 is arranged such that the direction Y is in the direction toward the rear of the cargo compartment 2 (or in the reverse direction from the normal direction of travel of the cargo compartment 2) such that the system's prevention of the keeper 40 moving in the direction Y will retain the retaining member 11 in place to appropriately support any cargo disposed within the cargo compartment 2.

Figure 10:
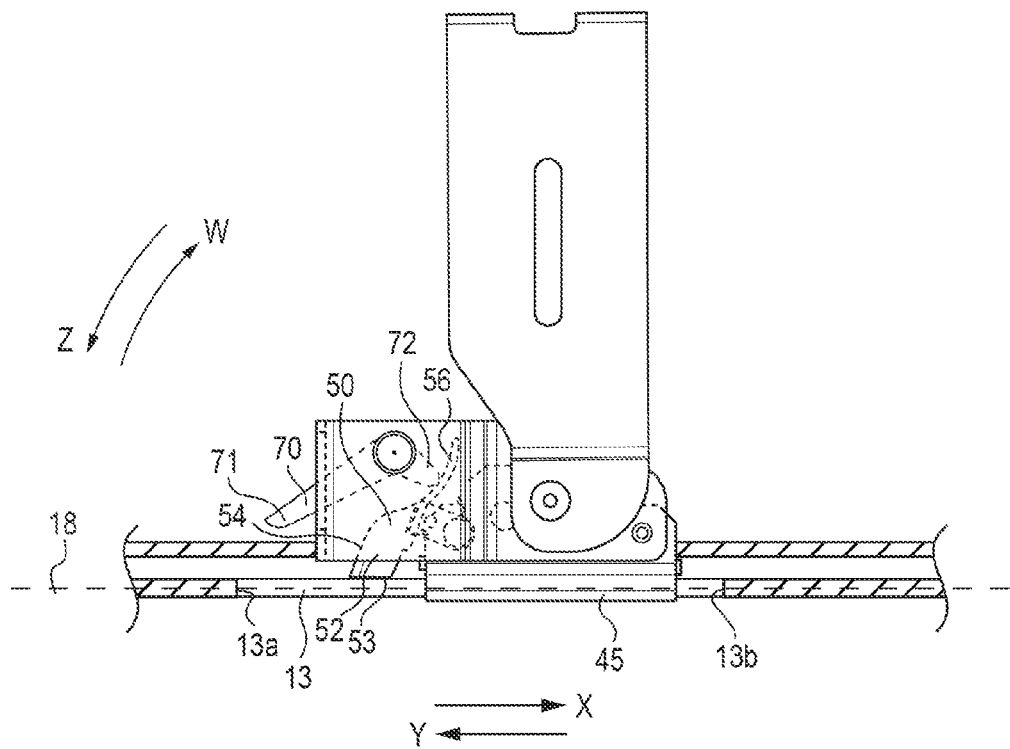
FIG. 10 is the view of FIG. 7 showing the finger in the neutral position.
Figure 11:
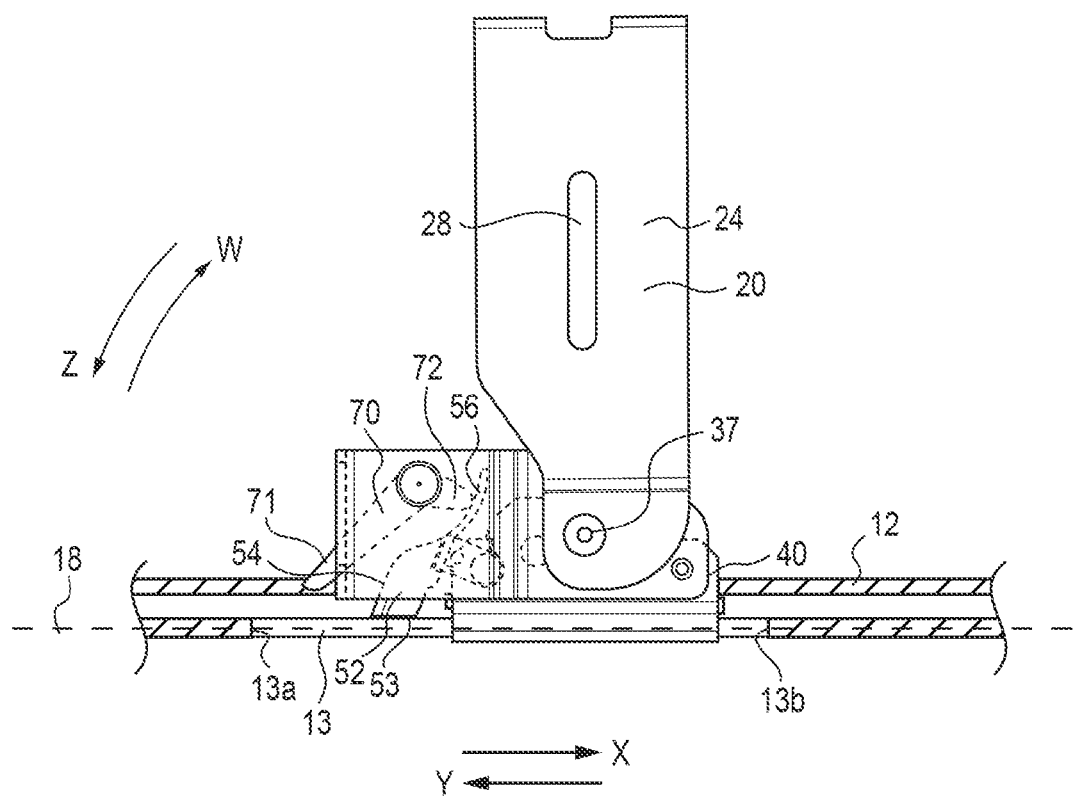
FIG. 11 is the view of FIG. 7 showing the finger in the sliding position.

FIGS. 10 and 11 depict the operator 70 being rotated to transfer the finger 50 from the engagement position through the neutral position (FIG. 10) and to the sliding position (FIG. 11). As mentioned above, the neutral position is a position of the finger/operator where the finger is stable and is disposed between the engagement position and the sliding position. As will be understood by one of ordinary skill in the art with a thorough review of the subject specification and drawings, the neutral position is a position where there is no rotation force (or torque) felt by the finger 50 (assuming that the operator 70 is held stationary), such that the finger remains in the neutral position on its own, and any force that is imparted upon the finger extends through the axis 19 of the pinned connection and therefore does not result in any torque on the finger. One of skill in the art will understand that, in embodiments where the finger is biased toward the engagement position in some of its range of motion, and where a remaining range of motion the finger is not biased toward the engagement position, a neutral position exists, although it need not be possible for the finger to remain in the neutral position.

FIG. 11 depicts the finger in the sliding position, which is on the opposite side of the neutral position from the engagement position. As can be understood with reference to FIGS. 10 and 11, when the user translates the input leg 71 of the operator toward the second edge 32*b* of the slot 32 in the housing 30, the second end 72 of the operator 70 slides along the cam surface of the second portion 56 of the finger 50, which causes the finger 50 to rotate in the direction Z, and causes the cantilevered portion 52 to extend above the bottom surface 12*a* of the track 12, which allows the keeper 40 to freely slide along the track 12 in either the X or Y directions. Once the user has established the desired position of the keeper 40, the user may rotate the input leg 71 of the operator 70 through the slot 32 and toward the first edge 32*a*. Once the user urges the input leg 71 far enough, the finger 50 passes through the neutral position, and with continued pivoting of the finger 50 the spring 39 urges the finger 50 toward the engagement position. If the keeper 40 is aligned where the cantilevered portion 52 enters a slotted opening 13, the keeper 40 can only be slid in the direction Y a distance until the cantilevered portion engages the leading edge 13*a* of the slotted portion, while the keeper 40 can be slid in the direction X (as discussed above) in a ratcheting manner.

As shown in FIGS. 10 and 11, in some embodiments, the cantilevered portion 52 of the finger 50 is above the bottom surface 12*a* of the track when the finger is in the neutral position, and remains above the track when the finger is urged to the siding position (FIG. 11). In those embodiments, the keeper 40 can be slid in both directions X and Y along the track when the keeper 40 is in the neutral position as well as when it transitions to the sliding position. In some embodiments, the finger 50 may be biased toward the sliding position when rotated slightly from the neutral position in the direction W (FIG. 10), while in some embodiments, the finger 50 is unbiased (in either direction) after it reaches the neutral position and is urged further toward the sliding position by continued motion of the input leg 71 of the operator 70 toward the second edge 32*a* of the slot 32 (FIGS. 5, 10, and 11).

One of ordinary skill in the art will contemplate that the available relative motion of the keeper 40 in the Y direction when in the engaged position is a function of the length of the slotted opening 13, and the length of the slotted opening 13 may be varied as desired for precise positioning of the elongate member 20 within the cargo compartment 2.

As shown in FIG. 1, in some embodiments a second set of tracks 15 may be provided within the cargo compartment 2 that are proximate to the floor of the cargo compartment 2. The second set of tracks 15 may receive corresponding retaining structures that fasten to the tracks 15 to bottom corners of the retaining member 11 fixed to the opposite side walls of the cargo compartment 2. In some embodiments, the tracks 15 may be like the tracks 12 and may slidably receive keepers 40 (each as discussed above), which are both fixed to an elongate member (similar to or different from the elongate member 20 discussed above), while in other embodiments, the track may be similar to a conventional A or E track, or another type of conventional track that is configured to receive a retention member 16 that is configured to fix with the track 15 at a desired location, either slidably mounted upon the track, or in other embodiments only mounted to the track at the fixation point an and released from the track when the retaining member 11 is to be moved (or withdrawn) from the cargo compartment 2.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A system for movable support within a cargo container, comprising:
 a keeper comprising a body and at least one leg that extends from the body and is configured to be slidably mounted within a track, the keeper is configured to receive and movably support an end of an elongate member, the keeper further comprises a finger that may be selectively disposed in an engagement position such that a cantilevered portion of the finger extends below a lower surface of the body, and a sliding position where the cantilevered portion is disposed above the lower surface of the body, and wherein when the finger transitions between the engagement position and the sliding position the finger transitions through a neutral position, and wherein the finger is biased to the engagement position when on a first side of the neutral position, and
 an operator that is operatively connected with the finger, the operator is manipulable to urge the finger to transition between the engagement and sliding positions,
 further comprising a housing that pivotably supports the operator, wherein the operator extends outside of the housing through a slot in the housing.

2. The system of claim 1, wherein the finger comprises a second portion opposite from the cantilevered portion, wherein rotation of the operator causes sliding motion of the operator along an outer surface of the second portion, which urges rotational movement of the cantilevered portion selectively toward the engagement position or toward the sliding position.

3. The system of claim 1, wherein a portion of the cantilevered portion of the finger is configured to contact a portion of the body when in the engagement position.

4. The system of claim 3, wherein the slot defines a first edge, wherein the operator contacts the first edge when the finger is in the engagement position.

5. The system of claim 3, wherein the finger is biased into the engagement position by a spring.

6. The system of claim 1, wherein the housing encloses and fixedly receives the body, and the housing at least partially encloses the operative connection between the operator and the finger.

7. The system of claim 1, wherein the finger is pivotably mounted to the body, and further comprising a spring that urges the finger into the engagement position.

8. The system of claim 1, wherein the operator pivots about a first pivot axis that is perpendicular to a first line parallel to the at least one leg and centered below the lower surface of the body, and that extends parallel to a direction of motion of the at least one leg through the track when installed therein.

9. The system of claim 1, wherein rotation of the operator slidingly engages an outer surface of second portion of the finger that is spaced from the cantilevered portion, such that rotation of the operator causes rotation of the finger about a second pivot axis.

10. The system of claim 1, wherein the end of the elongate member is pivotably supported upon the body of the keeper, such that the elongate member can extend from the body of the keeper such that a longitudinal axis though the elongate member can make an acute angle with respect to a longitudinal axis of the track when the keeper is slidably mounted therein, wherein the track is installed horizontally.

11. The system of claim 10, wherein the elongate member is pivotably supported upon the body of the keeper such that the elongate member can extend from the body of the keeper such that the longitudinal axis through the elongate member can make an acute angle with respect to the longitudinal axis of the track whether a horizontal vector component of the elongate member extends toward a first end of the track or whether the horizontal vector component of the track extends toward an opposite second end of the track.

12. The system of claim 1, wherein the first end of the elongate member is pivotably mounted with the keeper and an opposite second end of the elongate member is pivotably mounted to a second keeper with the same structure as the keeper, wherein the elongate member includes at least a first component that is slidably disposed with respect to a second component, such that a length between the first and second ends of the elongate member changes as the first and second components slide with respect to each other.

13. The system of claim 12, wherein the first and second components are telescopically mounted with respect to each other.

14. The system of claim 13, wherein the first component is a fixture that is rotatably fixed to the body of the respective keeper, wherein the fixture includes a longitudinal slot that receives a pin therethrough, the pin being fixed to the second component of the elongate member, wherein translation of the pin through the slot changes an overall length of the elongate member.

15. The system of claim 1, wherein the cantilevered portion is configured to extend into a first of a plurality of spaced slotted openings defined by leading and trailing edges in the track when the keeper is slidably mounted within the track, and wherein the cantilevered portion includes a leading surface that engages the trailing edge of the slotted opening when the keeper is slid in a first direction within the track, wherein the engagement of the leading surface and the trailing edge of the first slotted opening urges the finger to rotate toward sliding position until the cantilevered portion of the finger raises above the trailing edge of the first slotted opening.

16. The system of claim 15, wherein the leading surface extends at an acute angle with respect to a line parallel to the length of the at least one leg.

17. The system of claim 15, wherein the cantilevered portion comprises a trailing surface opposite from the leading surface, wherein the trailing surface extends substantially perpendicular to a line parallel to the length of the at least one leg when the finger is in the engagement position, wherein the keeper is configured such that engagement between the trailing surface and the leading edge of any of the plurality of spaced slotted openings when the keeper is slid in a second direction opposite from the first direction prevents further movement of the keeper in the second direction.

18. The system of claim 15, wherein with continued sliding of the keeper in the first direction within the track, the cantilevered portion encounters a second slotted opening of the plurality of slotted openings spaced from the first slotted opening and when the cantilevered portion slides past a leading edge of the second slotted opening the cantilevered portion extends into the second slotted opening.

19. The system of claim 1, wherein the finger is biased toward the sliding position when on a second side of the neutral position opposite from the first side of the neutral position toward the engagement position.

20. The system of claim 1, wherein the keeper is configured to be slidable within the track when installed within the track in either direction along the track when the finger is in the neutral position or in the sliding position.

21. The system of claim 1, wherein the elongate member is configured to support a portion of a separation member.

22. A system for movable support within a cargo compartment, comprising
first and second elongate tracks configured for being rigidly mounted upon opposite walls of the cargo compartment;
an elongate member;
a first keeper that supports a first end of the elongate member and a second keeper that supports a respective second end of the elongate member,
wherein each of the first and second keepers comprise a body and first and second legs that extend from the body and are configured to be slidably mounted within the respective first or second track when mounted to the respective wall of the cargo container, the keeper further comprises a finger that may be selectively disposed in an engagement position such that a cantilevered portion of the finger extends below a lower surface of the body, and a sliding position where the cantilevered portion is disposed above the lower surface of the body, and wherein when the finger transitions between the engagement position and the sliding position the finger transitions through a neutral position, and wherein the finger is biased to the engagement position when on a first side of the neutral position,
an operator that is operatively connected with the finger, the operator is manipulable to urge the finger to transition between the engagement and sliding positions, and
wherein the cantilevered portion is configured to extend into a first of a plurality of spaced slotted openings defined by leading and trailing edges in the track when the keeper is slidably mounted within the track, and wherein the cantilevered portion includes a leading surface that engages the trailing edge of the slotted opening when the keeper is slid in a first direction within the track, wherein the engagement of the leading surface and the trailing edge of the first slotted opening urges the finger to rotate toward sliding position until the cantilevered portion of the finger raises above the trailing edge of the first slotted opening.

23. The system of claim 22, wherein the finger comprises a second portion opposite from the cantilevered portion, wherein rotation of the operator causes sliding motion of the operator along an outer surface of the second portion, which urges rotational movement of the cantilevered portion of the finger selectively toward the engagement position or toward the sliding position.

24. The system of claim 22, further comprising a housing that pivotably supports the operator, wherein the operator extends outside of the housing through a slot in the housing.

25. The system of claim 24, wherein a portion of the cantilevered portion of the finger is configured to contact a portion of the body when in the engagement position.

26. The system of claim 25, wherein the finger is biased into the engagement position by a spring.

27. The system of claim 24, wherein the housing at least partially encloses the operative connection between the operator and the finger.

28. The system of claim 22, wherein the finger is pivotably mounted to the body, and further comprising a spring that urges the finger into the engagement position.

29. The system of claim 22, wherein the operator pivots about a first pivot axis that is perpendicular to a first line centered between the first and second legs and that extends parallel to a direction of motion of the first and second legs through the respective first or second track.

30. The system of claim 29, wherein the first pivot axis extends through the first line.

31. The system of claim 22, wherein rotation of the operator slidingly engages a second portion of the finger that is spaced from the cantilevered portion, such that rotation of the operator causes rotation of the finger about a second pivot axis.

32. The system of claim 22, wherein the finger comprises a working portion, wherein the working portion of the finger is planar along a length of the working portion, wherein the working portion slidingly contacts the operator with rotation of the operator.

33. The system of claim 22, wherein the finger comprises a working portion, wherein the working portion of the finger is arcuate along at least a portion of the length of the working portion, wherein the working portion slidingly contacts the operator with rotation of the operator.

34. The system of claim 22, wherein the respective first and second ends of the elongate member are each is pivotably supported upon the body of the respective first and second keeper, such that the elongate member can extend from the body of the respective first or second keeper such that a longitudinal axis though the elongate member can make an acute angle with respect to a longitudinal axis of the respective first or second track that receives the respective first or second keeper.

35. The system of claim 22, wherein each of the first end of the elongate member and the opposite second end of the elongate member are pivotably mounted with respective first or second keepers that are slidably mounted within respective first or second tracks, wherein the elongate member includes at least a first component that is slidably disposed with respect to a second component, such that a length between the first and second ends of the elongate member changes as the first and second components slide with respect to each other.

36. The system of claim 22, wherein each of the first end of the elongate member and the opposite second end of the elongate member are pivotably mounted with respective keepers that are slidably mounted within respective tracks, wherein the elongate member includes at least a first component that is slidably disposed with respect to a second component, such that a length between the first and second ends of the elongate member changes as the first and second components slide with respect to each other.

37. The system of claim 36, wherein the first component is a fixture that is rotatably fixed to the body of the respective keeper, wherein the fixture includes a longitudinal slot that receives a pin therethrough, the pin being fixed to the second component of the elongate member, wherein translation of the pin through the slot changes an overall length of the elongate member.

38. The system of claim 22, wherein the leading surface extends at an acute angle with respect to a line parallel to the length of the at least one leg.

39. The system of claim 22, wherein the cantilevered portion comprises a trailing surface opposite from the leading surface, wherein the trailing surface extends substantially perpendicular to a line parallel to the length of the at least one leg when the finger is in the engagement position, wherein the keeper is configured such that engagement between the trailing surface and a leading edge any one of the plurality of spaced slotted openings when the keeper is slid in a second direction opposite from the first direction prevents further movement of the keeper in the second direction.

40. The system of claim 22, wherein with continued sliding of the keeper in the first direction within the track, the cantilevered portion encounters a second slotted opening of the plurality of slotted openings spaced from the first slotted opening and when the cantilevered portion slides past a leading edge of the second slotted opening the cantilevered portion extends into the second slotted opening.

41. The system of claim 22, wherein the finger is biased toward the sliding position when on a second side of the neutral position opposite from the first side of the neutral position toward the engagement position.

42. The system of claim 22, wherein the keeper is configured to be slidable within a track when installed within the track in either direction along the track when the finger is in the neutral position or in the sliding position.

43. The system of claim 22, wherein the elongate member is configured to hangably support a movable separation member.

44. A system for movable support within a cargo container, comprising:
a keeper comprising a body and at least one leg that extends from the body and is configured to be slidably mounted within a track, the keeper is configured to receive and movably support an end of an elongate member, the keeper further comprises a finger that may be selectively disposed in an engagement position such that a cantilevered portion of the finger extends below a lower surface of the body, and a sliding position where the cantilevered portion is disposed above the lower surface of the body, and wherein when the finger transitions between the engagement position and the sliding position the finger transitions through a neutral position, and wherein the finger is biased to the engagement position when on a first side of the neutral position,
an operator that is operatively connected with the finger, the operator is manipulable to urge the finger to transition between the engagement and sliding positions, and
wherein the cantilevered portion is configured to extend into a first of a plurality of spaced slotted openings defined by leading and trailing edges in the track when the keeper is slidably mounted within the track, and wherein the cantilevered portion includes a leading surface that engages the trailing edge of the slotted opening when the keeper is slid in a first direction within the track, wherein the engagement of the leading surface and the trailing edge of the first slotted opening urges the finger to rotate toward sliding position until the cantilevered portion of the finger raises above the trailing edge of the first slotted opening.

\* \* \* \* \*

UNITED STATES PATENT AND TRADEMARK OFFICE
CERTIFICATE OF CORRECTION

PATENT NO. : 9,566,895 B2  
APPLICATION NO. : 14/744281  
DATED : February 14, 2017  
INVENTOR(S) : Howard T. Knox It is certified that error appears in the above-identified patent and that said Letters Patent is hereby corrected as shown below:

In the Claims

In Column 10, Claim 9, Line 15, after "outer surface of" insert --the--.

In Column 10, Claim 10, Line 22, after "longitudinal axis" replace "though" with --through--.

In Column 12, Claim 34, Line 49, after "member are each" delete "is".

Signed and Sealed this  
Twenty-fifth Day of April, 2017

Michelle K. Lee  
*Director of the United States Patent and Trademark Office*